US008589387B1

(12) United States Patent
Brin (10) Patent No.: US 8,589,387 B1
(45) Date of Patent: Nov. 19, 2013

(54) INFORMATION EXTRACTION FROM A DATABASE

(75) Inventor: Sergey Brin, Palo Alto, CA (US)

(73) Assignees: Google Inc., Mountain View, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/615,811

(22) Filed: Sep. 14, 2012

Related U.S. Application Data (60) Continuation of application No. 13/243,133, filed on Sep. 23, 2011, now Pat. No. 8,332,371, which is a continuation of application No. 12/689,799, filed on Jan. 19, 2010, now Pat. No. 8,037,065, which is a division of application No. 10/734,111, filed on Dec. 15, 2003, now Pat. No. 7,650,330, which is a continuation of application No. 09/521,996, filed on Mar. 9, 2000, now Pat. No. 6,678,681.

(60) Provisional application No. 60/123,583, filed on Mar. 10, 1999.

(51) Int. Cl.
*G06F 17/00* (2006.01)

(52) U.S. Cl.
USPC ........... 707/723; 707/735; 707/726; 707/640; 707/648; 707/706

(58) Field of Classification Search
USPC ......... 707/696, 644, 648, 706–708, 723, 735, 707/726
See application file for complete search history.

(56) References Cited

U.S. PATENT DOCUMENTS

| | | | | |
|---|---|---|---|---|
| 4,589,140 A | * | 5/1986 | Bishop et al. | 382/148 |
| 5,384,894 A | * | 1/1995 | Vassiliadis et al. | 706/52 |
| 5,727,196 A | * | 3/1998 | Strauss et al. | 707/696 |
| 5,748,953 A | * | 5/1998 | Mizutani et al. | 1/1 |
| 5,761,652 A | | 6/1998 | Wu et al. | |
| 5,825,923 A | | 10/1998 | Thompson et al. | |
| 5,884,089 A | | 3/1999 | Orian et al. | |
| 5,991,756 A | * | 11/1999 | Wu | 707/706 |
| 6,076,088 A | | 6/2000 | Paik et al. | |
| 6,081,774 A | | 6/2000 | De Hita et al. | |
| 6,131,082 A | * | 10/2000 | Hargrave et al. | 704/7 |
| 6,167,368 A | * | 12/2000 | Wacholder | 704/9 |
| 6,556,860 B1 | | 4/2003 | Groenewegen | |
| 6,571,243 B2 | | 5/2003 | Gupta et al. | |
| 6,678,681 B1 | | 1/2004 | Brin | |

(Continued)

OTHER PUBLICATIONS

Niemann, H., et al.: "ERNEST: A Semantic Network System for Pattern Understanding", IEEE Transactions of Pattern Analysis and Machine Intelligence, vol. 12, No. 9, Sep. 1990, pp. 883-905.

(Continued)

*Primary Examiner* — Sana Al Hashemi
(74) *Attorney, Agent, or Firm* — Harrity & Harrity, LLP (57) ABSTRACT

Techniques for extracting information from a database are provided. A database such as the Web is searched for occurrences of tuples of information. The occurrences of the tuples of information that were found in the database are analyzed to identify a pattern in which the tuples of information were stored. Additional tuples of information can then be extracted from the database utilizing the pattern. This process can be repeated with the additional tuples of information, if desired.

20 Claims, 10 Drawing Sheets

(56) References Cited

U.S. PATENT DOCUMENTS

| | | | |
|---|---|---|---|
| 6,801,916 B2 * | 10/2004 | Roberge et al. ...................... | 1/1 |
| 7,650,330 B1 | 1/2010 | Brin | |
| 8,037,065 B1 | 10/2011 | Brin | |
| 8,332,371 B1 | 12/2012 | Brin | |

OTHER PUBLICATIONS

Dar, S. et al: "Semantic Data Caching and Replacement", Proceedings of the 22nd VLDB Conference, 1996, 12 pages.

Frawley W., et al.: "Knowledge Discovery in Databases: An Overview", AI Magazine vol. 13, No. 3, 1992, pp. 57-70.

Shekhar, S., et al.: "Learning Transformation Rules for Semantic Query Optimization: A Data-Driven Approach", IEEE Transactions on Knowledge and Data Engineering, 1993, 29 pages.

Berners-Lee, T., et al.: "The Semantic Web", Scientific American, May 17, 2001, 18 pages.

Berners-Lee, T., et al.: "Semantic Web Road map", print date Jun. 10, 2004, 10 pages.

Berners-Lee, T., et al.: "Conceptual Graphs and the Semantic Web", retrieved online at http://www.w3.org/DesignIssues/CG.html, last modified Apr. 24, 2008, print date Jul. 9, 2013, 7 pages.

Deerwester, S. et al.: "Indexing by Latent Semantic Analysis", Journal of the American Society for Information Science, vol. 41, No. 6, 1990, pp. 391-407.

Fernandez, M., et al.: "A Query Language and Processor for a Web-Site Management System", In Proc. of Workshop on Management of Semistructured Data, 1997, 8 pages.

* cited by examiner

| AUTHOR | TITLE |
|---|---|
| Isaac Asimov | The Robots of Dawn |
| David Brin | Startide Rising |
| James Gleick | Chaos: Making a New Science |
| Charles Dickens | Great Expectations |
| William Shakespeare | The Comedy of Errors |

FIG. 8

| URL PATTERN | TEXT PATTERN |
|---|---|
| www.sff.net/locus/c.* | <LI><B>*title*</B> by *author* ( |
| dns.city-net.com/$\tilde{t}$ mann/awards/hugos/1984.html | <I>*title*</I> by author ( |
| dolphin.upenn.edu/$\tilde{d}$ cummins/texts/sf-award.htm | author ‖ title ‖ ( |

FIG. 9

| AUTHOR | TITLE |
|---|---|
| H.D. Everett | The Death-Mask and Other Ghosts |
| H.G. Wells | First Men in the Moon |
| H.G. Wells | Science Fiction: Volume 2 |
| H.G. Wells | The First Men in the Moon |
| H.G. Wells | The Invisible Man |
| H.G. Wells | The Island of Dr. Moreau |
| H.G. Wells | The Science Fiction Volume 1 |
| H.G. Wells | The Shape of Things to Come: The Ultimate Revolution |
| H.G. Wells | The Time Machine |
| H.G. Wells | The War of the Worlds |
| H.G. Wells | When the Sleeper Wakes |
| H.M. Hoover | Journey through the Empty |
| H.P. Lovecraft & August Derleth | The Lurker at the Threshold |
| H.P. Lovecraft | At the Mountains of Madness and Other Tales of Terror |
| H.P. Lovecraft | The Case of Charles Dexter Ward |
| H.P. Lovecraft | The Doom That Came to Sarnath and Other Stories |

FIG. 10

| AUTHOR | TITLE |
|---|---|
| H.D. Everett | The Death-Mask and Other Ghosts |
| Henry James | The Europeans |
| Henry James | The Golden Bowl |
| Henry James | The Portrait of a Lady |
| Henry James | The Turn of the Screw |
| Henry James | Turn of the Screw |
| Henry John Coke | Tracks of a Rolling Stone |
| Henry K. Rowe | Landmarks in Christian History |
| Henry Kisor | Zephyr |
| Henry Lawson | In the Days When the World Was Wide |
| Henry Longfellow | The Song of Hiawatha |
| Henry Miller | Tropic of Cancer |
| Henry Petroski | Invention on Design |
| Henry Petroski | The Evolution of Useful Things |
| Henry Roth | Call It Sleep |
| Henry Summer Maine | Ancient Law |
| Henry Tuckerman, Lindsay. Phila | Characteristics of Literature |
| Henry Van Dyke | The Blue Flower |
| Henry Van Dyke, Scrib· | Days Off |
| Henry Van Loon | Life and Times of Pieter Stuyvesant |
| Henry Wadsworth Longfellow | Paul Revere's Ride |
| Henry Wadsworth Longfellow | Evangeline |
| Henry Wadsworth Longfellow | The Song of Hiawatha |
| Herbert Donald | Lincoln |
| Herbert M. Hart | Old Forts of the Northwest |
| Herbert M. Mason, Jr. | The Lafayette Escadrille |
| Herbert R. Lottman | Jules Verne: An Exploratory Biography |
| Herbert Spencer | The Man Versus the State |
| Herman Daly | For the Common Good |
| Herman Daly | Valuing the Earth |
| Herman E. Kittredge | Ingersoll: A Biographical Appreciation |
| Herman Haken | Principles of Brain Functioning |
| Herman Hesse | Demian |
| Herman Hesse | Siddhartha |
| Herman Hesse | Sidharta |
| Herman Melville | Bartleby, the Scivener |
| Herman Melville | Billy Budd |
| Herman Melville | Billy Budd |

FIG. 11A

| AUTHOR | TITLE |
|---|---|
| Herman Melville | Moby Dick |
| Herman Melville | The Confidence Man |
| Herman Melville | The Encantadas, or Enchanted Isles |
| Herman Melville | Typee: A Peep at Polynesian Life |
| Herman Weiss | Sunset detectives |
| Herman Wouk | War and Remembrance |
| Herman Hesse | Klingsor's Last Summer |
| Herman Hesse | Knulp |
| Herman Hesse | Rosshalde |
| Herman Hesse | Strange News From Another Star |
| Herodotus | Histories |
| Herodotus | The Histories |
| Herodotus | The History of Herodotus |
| Herschel Hobbs | Pastor's Manual |
| Hetschel | First Stage: Moon |
| Hiaasen | Stormy Weather |
| Hilaire | Survivals and New Arrivals |
| Hilaire | The Great Heresies |
| Hilary Bailey | Cassandra: Princess of Troy |
| Hilary Norman | The Key to Susanna |
| Hilbert Schenck | Chronosequence |
| Hilbert Schenck | The Battle of the Abaco Reefs |
| Hilda Conkling | Poems by a Little Girl |
| Hilda Hughes | Shudders |
| Hilda Hughes | When Churchyards Yawn |
| Hillerman | A Thief of Time |
| Hillerman | Skinwalkers |
| Hillerman | Talking to God |
| Hiram Corson | Introduction to Browning |
| Hjalmar Hjorth Boyesen | Boyhood in Norway |
| Hjalmar Hjorth Boysen | Tales From Two Hemispheres |

FIG. 11B

INFORMATION EXTRACTION FROM A DATABASE

CROSS-REFERENCE TO RELATED APPLICATIONS

This application is a continuation of U.S. patent application Ser. No. 13/243,133, filed Sep. 23, 2011, which is a continuation of U.S. patent application Ser. No. 12/689,799, filed Jan. 19, 2010 (now U.S. Pat. No. 8,037,065), which is a divisional of U.S. patent application Ser. No. 10/734,111, filed Dec. 15, 2003 (now U.S. Pat. No. 7,650,330), which is a continuation of U.S. patent application Ser. No. 09/521,996, filed Mar. 9, 2000 (now U.S. Pat. No. 6,678,681), which claims the benefit of U.S. Provisional Patent Application No. 60/123,583, filed Mar. 10, 1999, the contents of which are hereby incorporated by reference.

BACKGROUND OF THE INVENTION

The present invention relates to extracting information from a database. More specifically, the invention relates to searching for tuples of information in order to identify patterns in which the tuples were stored so that additional tuples can be extracted from the database.

The Internet, and more particularly the World Wide Web ("Web"), is a vast repository of information that is extremely distributed, both in the location and manner in which the information is stored. For example, a particular type of data such as restaurant lists may be scattered across thousands of independent information sources (e.g., hosts) in many different formats.

One way that this information is extracted from the Web is by individual users that traverse ("surf") the Web to locate information of interest and manually extract the information. It should be quite evident that this method is very tedious and does not easily provide a comprehensive search. Although multiple users can be employed to perform this manual information extraction, the cost for mining the desired information from the Web is extremely high and does not provide adequate coverage of the Web.

There has also been considerable work on integrating a number of information sources using specially coded wrappers or filters. Although this work has met with some amount of success, the creation of wrappers can be quite time consuming and thus, is usually suited for only tens, not thousands (or more) of information sources. Considering the vast size of the Web and its continual growth, the manual creation of wrappers does not provide an efficient mechanism for extracting information from a database such as the Web.

Therefore, what are needed are innovative techniques for extracting information from databases. Additionally, it would be desirable if the relevant information was extracted from the numerous and distributed information sources automatically or with very minimal human intervention

SUMMARY OF THE INVENTION

The present invention provides innovative techniques for extracting information and patterns from a database such as the Web. One can begin with one or more tuples of information that act as the initial seed for the search. The database (or databases) is searched for occurrences of the tuples and patterns are identified in which they are stored. These patterns are used to extract more tuples from the database and the process can be repeated for the new tuples. Information can be extracted from a database efficiently and accurately with little or no human interaction. Some specific embodiments of the invention are described below.

In one embodiment, the invention provides a computer implemented method of extracting information from a database. The database is searched for occurrences of at least one tuple of information. An occurrence of a tuple of information that was found is analyzed to identify a pattern in which the tuple of information was stored. Additional tuples of information are extracted from the database utilizing the pattern. In some embodiments, the process is repeated until a predetermined number of tuples are found or until no new patterns are identified.

In another embodiment, the invention provides a computer implemented method of extracting information from a database. The database is searched for occurrences of tuples of information. Occurrences of the tuples of information that were found are analyzed to identify a pattern in which the tuples of information were stored. A pattern includes a prefix text, a middle text and suffix text, where the prefix text precedes desired information in the tuples of information, the middle text is between desired information in the tuples of information and the suffix text follows desired information in the tuples of information. Additional tuples of information are extracted from the database utilizing the pattern and the process is repeated for additional tuples of information.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that extract information and patterns from the Web. More specifically, the embodiments will be described in reference to utilizing tuples of information to identify patterns in which the tuples are stored so that additional tuples can be found. However, embodiments of the invention are not limited to any particular environment, application or specific implementation. Therefore, the description of the embodiments that follows is for purposes of illustration and not limitation.

Figure 1:
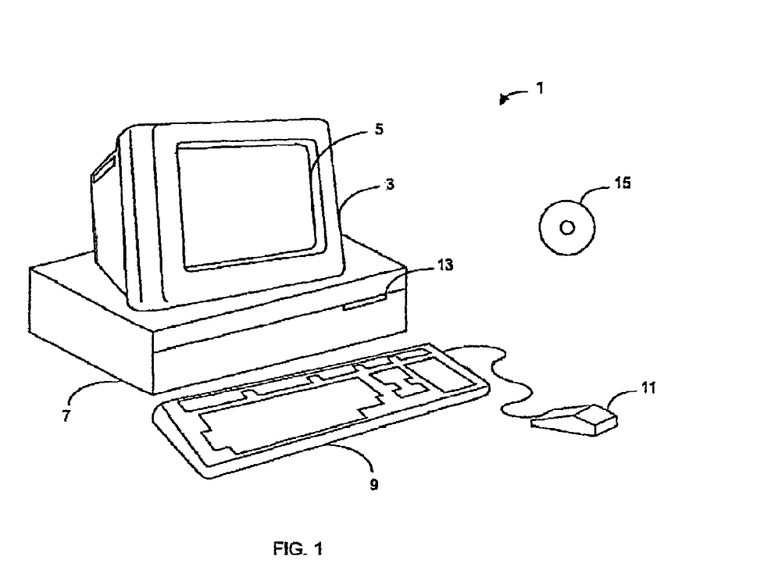
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
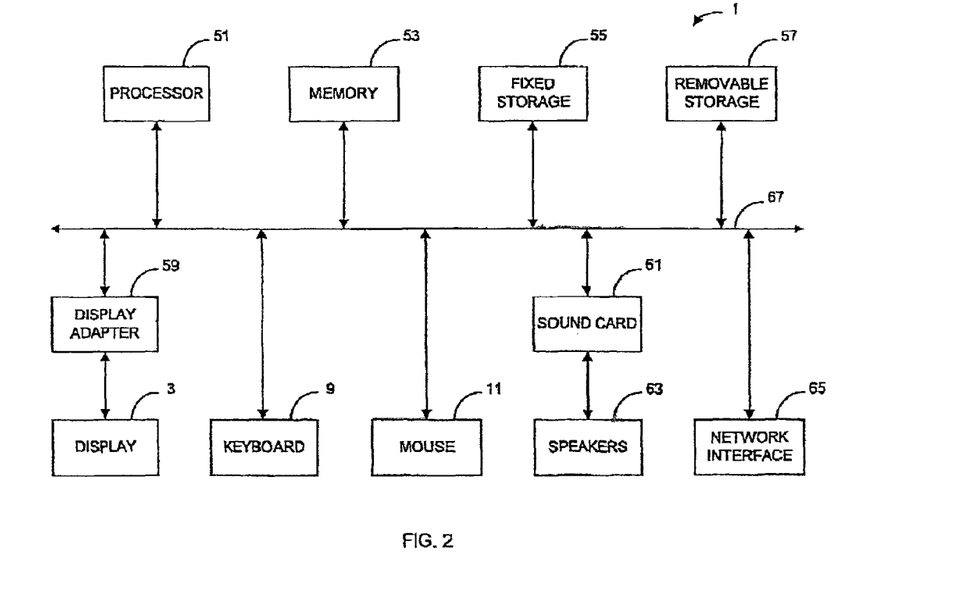
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
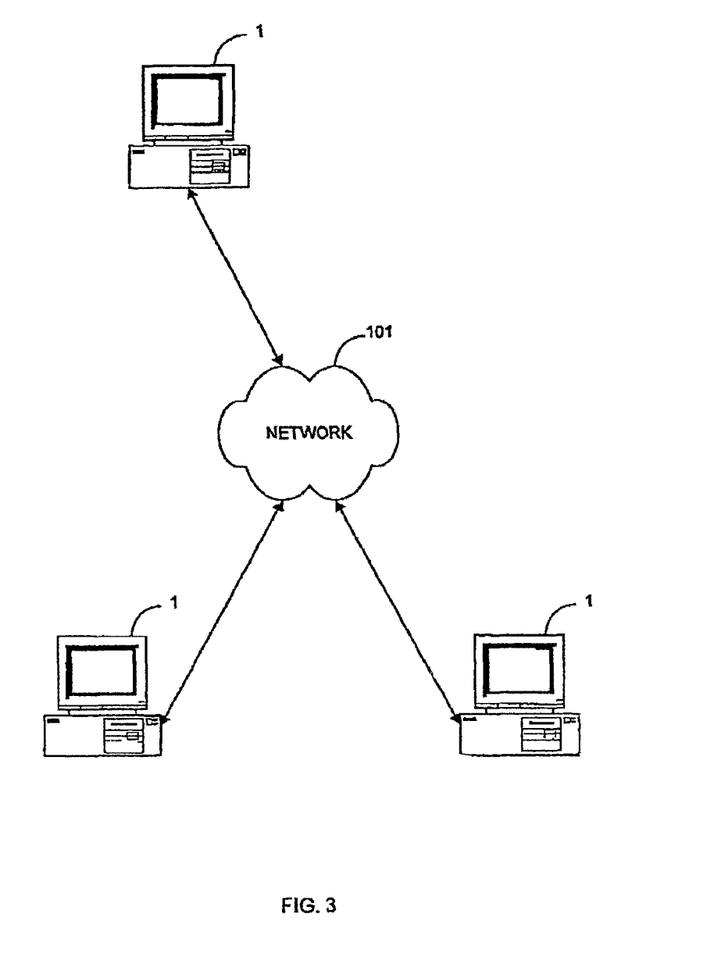
FIG. 3 illustrates a network of multiple computer systems such as the Internet.

FIG. 3 shows a network of multiple computer systems. A network 101 provides communication between multiple computer systems 1. In a wide area network such as the Internet, some of the computer systems are servers (or hosts) and provide access to resources such as information or services to client computer systems on the network. With respect to the Web, there are thousands of server computer systems that store the web pages that make up the Web. The web pages typically include links in the form of uniform resource locators (URLs) that are a link to another web page, whether it is on the same server or a different one.

As described above, the Web is a distributed network of web pages. Networks of hyperlinked documents can also be present in local area networks (e.g., intranets). The operation of these intranets is very similar to the Internet except that it is not uncommon for all or a majority of the hyperlinked documents of an intranet to be stored on a single server computer system.

In general, embodiments of the invention rely on the duality between patterns and relations, which can be called Dual Iterative Pattern Relation Expansion (DIPRE). Let D be a large database of unstructured information such as the Web. Let $R=r_1, \ldots, r_n$ be the target relation. Every tuple t of R occurs in one or more times in D. Every such occurrence consists of all the fields of t, represented as strings, occurring in close proximity to each other in D (in the case of the Web, this typically means all the fields are near each other, on the same web page).

As an example, suppose the target relation R is the set of books, (author,title) pairs, that occur on the Web. Thus, the relation R=(author, title), where $r_1$=author and $r_2$=title. We will call information that may satisfy the relation a "tuple" of information. Accordingly, the tuple ("Isaac Asimov", "The Robots of Dawn") satisfy the relation of books described above. As used herein, a tuple is a set of related information.

Given a potential author and title and where they are mentioned on the Web, a user can generally tell whether this is a legitimate book. However, it would be beneficial if a computer can automatically determine if a potential match has been found and utilize matches to identify other patterns that can then be used to find more matches.

If an approximation R' of R is computed, the coverage is $$\frac{|R' \cap R|}{|R|}$$

and the error rate is $$\frac{|R' \cap R|}{|R'|}.$$

It would be desirable to maximize coverage and minimize the error rate. However, a low error rate may be much more critical than high coverage. Given a sufficiently large database D, a recall of just 20% may be acceptable. However, an error rate over 10% would likely be useless for many applications.

With very large databases, it is very difficult, if not impossible, to actually compute R. Therefore, it can be difficult to calculate the precise values of coverage and error rate. However, the error rate can be estimated by having a user check random elements of R'. Coverage is typically much more difficult to estimate.

Intuitively, a pattern matches one particular format of occurrences of tuples of the target relation. Ideally the pattern is specific enough not to match any tuples that should not be in the relation, however, in practice a few false positives may occur. Patterns may have various representations. For example, patterns may be defined by regular expressions, context free grammars or any computable functions.

Let p be a pattern. Then $M_D(p)$ is the set of tuples that match p in D and $|p|_D$ is the number of elements in $M_D(p)$. Then coverage of $p, C_D(p,R)=|M_D(p) \cap R|/|R|$ and the error rate of p is $E_D(P,R)=|M_D(p)-R|/|M_D(p)|$.

For a set of patterns, $P=p_1, \ldots, p_k$, the set of tuples that match the patterns can be defined as $M_D(P) \cup_{p_t P} M_D(p)$. The coverage $C_D(P,R)$ and error rate $E_D(P,R)$ can be extended analogously. Alternative definitions of $M_D(P)$ may require a tuple to match multiple patterns as will be discussed in more detail below.

An important observation is that given a set of patterns P with high coverage and low error rate, a very good approximation to R can be calculated by finding all matches to all the patterns. Thus, given a good set of patterns, a good set of tuples can be found. However, it would be desirable to also achieve the converse property—given a good set of tuples, a good set of patterns can be identified. Both goals can be achieved by finding all occurrences of the tuples in D and discovering similarities in the occurrences. The combination of the ability to find tuples from patterns and patterns from tuples provides great power and is the basis for one aspect of the invention.

Figure 4:
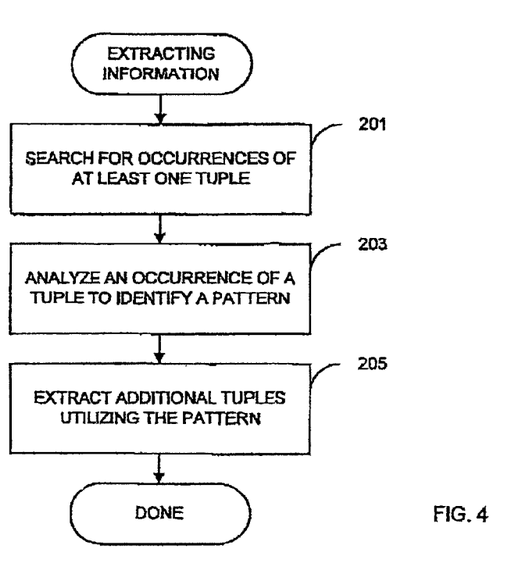
FIG. 4 shows a flow chart of a process of extracting information from a database.

FIG. 4 shows a flow chart of a process of extracting information from a database. At a step 201, a search is performed on the database for occurrences of at least one tuple of information. An occurrence of a tuple (or multiple occurrences of tuples) that was found is analyzed to identify a pattern in which the tuple of information was stored. At a step 205, additional tuples of information are extracted from the database utilizing the pattern that was identified.

Figure 5:
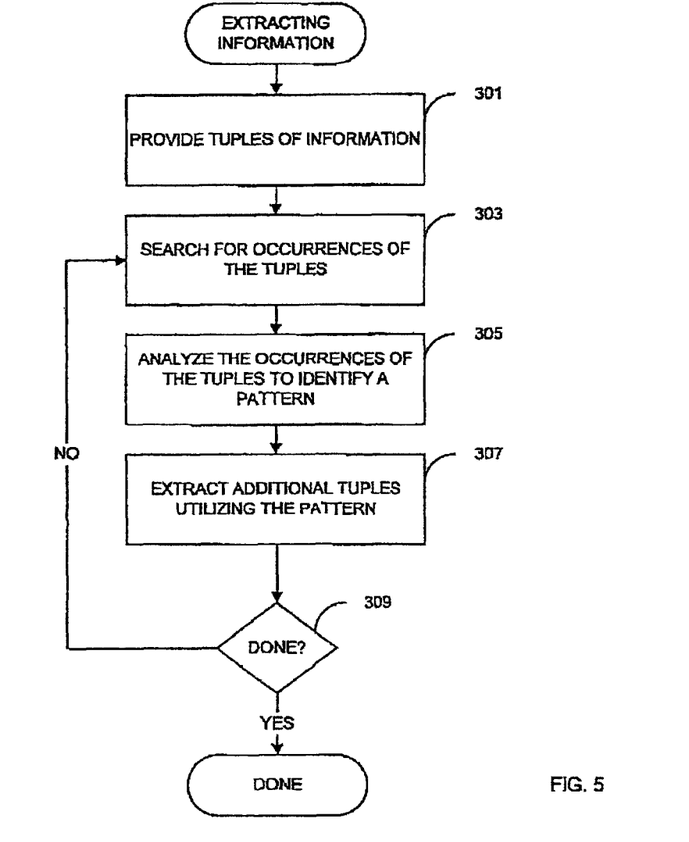
FIG. 5 shows a flow chart of another process of extracting information from a database.

As described, occurrences of tuples can be analyzed to identify patterns, which can then be utilized to extract or find more tuples. The process can then be repeated for the additional tuples. FIG. 5 shows a flow chart of another process of extracting information from a database that illustrates this iterative process.

At a step 301, tuples of information are provided as examples of information that are desired. These initial tuples of information ideally satisfy the target relation and act as a seed from which more tuples of information that satisfy the target relation will be found. Thus, one starts with a small sample R' of the target relation, R'←Sample. Typically, this sample is given by the user and can be very small.

The database is searched for occurrences of the tuples of information at a step 303. This can be expressed as O←FindOccurrences (R',D). In practice, an occurrence is evidenced by fields of the tuples being in fairly close proximity in text (e.g., the text of HyperText Markup Language or HTML). In preferred embodiments, the context of every occurrence (e.g., URL and surrounding text) is stored along with the tuple found.

At a step 305, the occurrences of the tuples of information that were found in the database are analyzed to identify a pattern in which the tuples of information were stored. In other words, patterns are generated based on the sets of occurrences of tuples, P←GenPatterns(O). Ideally, patterns should be generated for sets of occurrences with similar context. The patterns should to have a low error rate so it is important that they are not overly general. The higher the coverage of the patterns the better. However, a low coverage can be compensated for with a larger database.

Additional tuples of information are extracted from the database utilizing the pattern at a step 307. Thus, the database is searched for tuples that match any of the identified patterns, R'←$M_D$(P). At a step 309, it is determined if the process is done. If not, the flow returns to step 303 to search for occurrences of the additional tuples of information in the database. The test for whether the process is done can vary in different embodiments. In one embodiment, if R' is large enough (e.g., greater than a predetermined number), then the process is done.

The above process is not necessarily very stable and may stray away from R. In particular, several erroneous or bogus tuples in $M_D$(P) can lead to several erroneous patterns in P in the next iteration. This in turn can cause a whole slew of erroneous tuples. For this reason, the GenPatterns routine should be careful to minimize the amount of damage caused by a potentially erroneous tuple (or several small tuples). Another measure of safety is to define $M_D$(P) more stringently so as to require tuples to match multiple patterns in P. Although not necessary, the results may improve if tuples are verified more stringently. Finally, the various thresholds may need to fluctuate as the relation expands.

In one embodiment, the patterns that are identified in step 305 are evaluated according to a criteria (e.g., the number of tuples that match each pattern, the specificity of each pattern, and the like). The patterns with the highest evaluation, whether being a predetermined number of patterns, those over a threshold or any other selection mechanism, are processed further. In a similar manner, the tuples of information that are extracted in step 307 can be evaluated according to a criteria (e.g., the number of patterns each tuple matches) and the tuples with the highest evaluation are processed further. As mentioned above, it may be beneficial to vary the thresholds as the relation expands.

Figure 6:
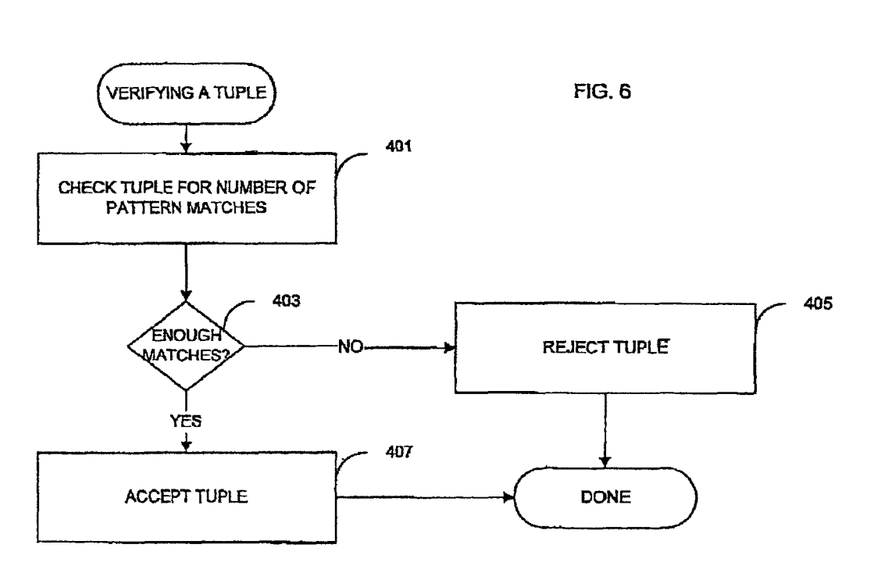
FIG. 6 shows a flowchart of a process of identifying a pattern from tuples of information that have been found in a database.

FIG. 6 shows a flow chart of a process of verifying a tuple of information that can be performed when additional tuples are extracted from the database utilizing a pattern. At a step 401, the tuple of information that was found utilizing a pattern is checked to see how many patterns the tuple matches. If, at a step 403, the tuple does not match at least the predetermined number of patterns (e.g., more than 1), the tuple is rejected at step 405. Otherwise, the tuple can be accepted at a step 407.

In order to more clearly describe the invention, it may be beneficial to now describe a specific experiment utilizing an embodiment of the invention. In the experiment, it is desired to extract from the Web tuples that satisfy a relation (author, title). In other words, a user would like to extract the authors and titles of books on the Web. This problem lends itself particularly well to the invention because there are a number of well-known books that are listed on may web sites. Many of the web sites conform to a reasonably uniform format across the site.

A pattern is a template for finding additional tuples of information that may satisfy the desired information. A pattern typically needs to be lexically defined because it will be utilized to find the desired information on the books. The lexical definition of a pattern can largely determine how successful the information extraction will be. However, even a very simple lexical definition of a pattern that will be used for this example can generate excellent results. More sophisticated lexical definitions of patterns may provide better results.

In this example, a pattern is a five-tuple of (order, urlprefix, prefix, middle, suffix), where order is a Boolean value and the other attributes are strings. If order is true, the pattern is for an author followed by a title. Otherwise, if order is false, the title precedes the author.

An (author,title) pair matches the pattern if there is a document in the collection (e.g., the Web) with a URL that matches urlprefix* and which contains text that matches the regular expression: *prefix, author, middle, title, suffix*. It should be understood that prefix is text that precedes desired information in the tuples of information, middle is text between desired information tuples of information and suffix is text that follows desired information tuples of information. With this simple example, there is only one middle, but the invention can be advantageously applied to extracting information with more than two fields and the number of middle texts in the patterns can be similarly increased.

In the experiment, the author was restricted to $[A-Z][A-Za-z.,\&]_{5,30}[A-Za-z.]$ and the title was restricted to $[A-Z0-9][A-Za-z0-9.,:'\#!?;\&]^{4,45}[A-Za-z0-9?!]$. These expressions simply define the strings of characters that will be allowed to make up an author and title, respectively, and will be utilized during a lexical search of the Web for tuples of information. In other embodiments, the expressions can be varied accordingly.

An occurrence can be lexically defined in correspondence to the definition of a pattern. An occurrence of an (author,title) pair can consist of a seven-tuple: (author, title, order, url, prefix, middle, suffix). The order corresponds to the order the author and title occurred in the text. The url is the URL of the document in which the they occurred. The prefix includes the m characters (e.g., 10) preceding the author (or title if the title was first). The middle is the text between the author and the title. Lastly, the suffix includes the m characters following the title (or author). In other embodiments, the prefix and suffix can be different lengths. Additionally, the prefix and suffix can be less than m characters if the line ends or starts close to the occurrence.

Now that examples of patterns and occurrences have been described, a process of generating patterns, GenPatterns(O), will be described. Initially, all occurrences o in O are grouped by order and middle. In other words, in each group, the values for the fields' order and middle are the same. The resulting groups shall be designated $O_1, \ldots, O_k$. The occurrences in each group can then be analyzed to identify a pattern as follows.

Figure 7:
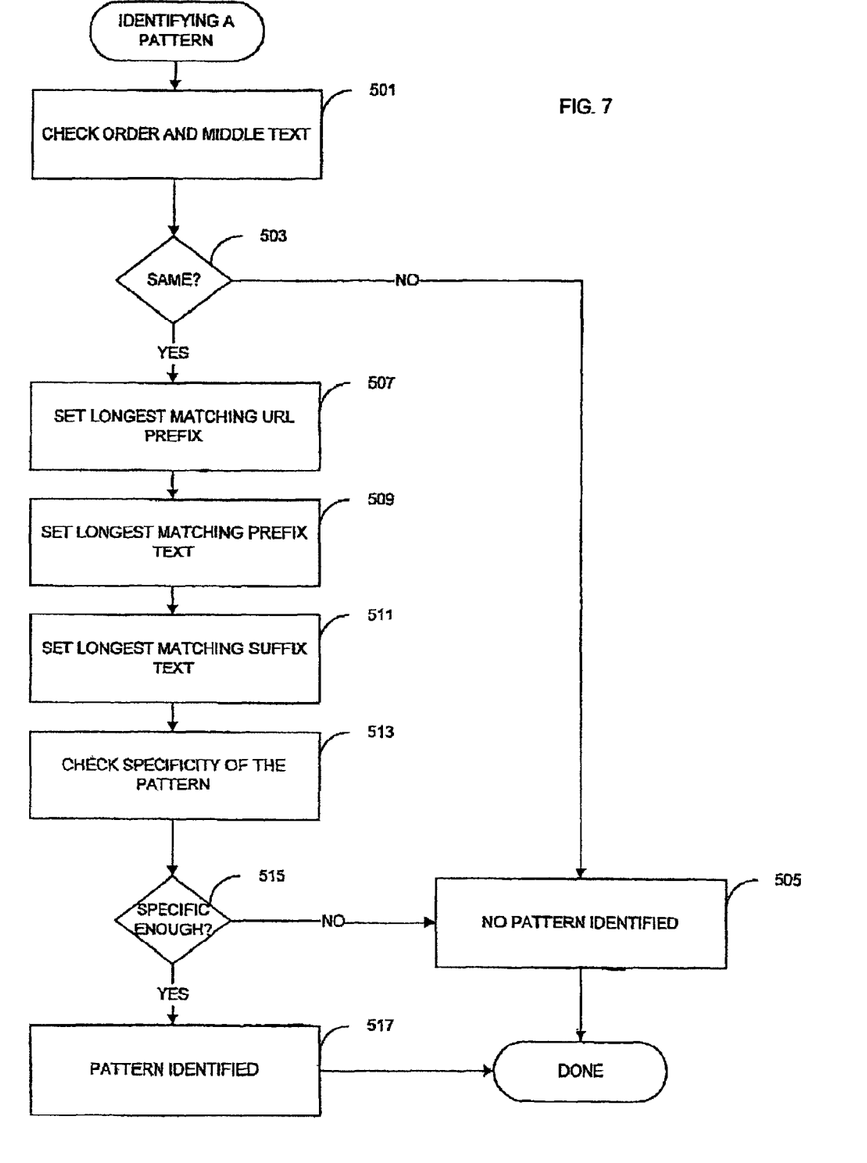
FIG. 7 shows a flow chart of a process of verifying a tuple of information.

FIG. 7 shows a flow chart of a process of identifying a pattern in multiple occurrences. At a step 501, the order and middle text are checked to verify that they are the same between or among the occurrences. If they are determined to not be the same at a step 503, then no pattern is identified at a step 505. It is nearly impossible to generate a pattern to match all the occurrences if the order and middle text are not the same. If the groups have been assembled accordingly to the same order and middle text, steps 501, 503 and 505 may not be necessary. The order and middle fields of the pattern can be set according to the group. As with any of the flow charts herein, steps can be added, deleted, combined, and reordered without departing from the spirit and scope of the invention.

At a step 507, the longest matching URL prefix of the occurrences in the group is set to the field urlprefix of the pattern. The longest matching prefix text of the occurrences in the group is set to the field prefix at a step 509. At a step 511, the longest matching suffix text of the occurrences in the group is set to the field suffix.

The specificity of the pattern can be checked at a step 513. A pattern generated like the above can be too general or too specific. In general, it is not a concern to be too specific since there will be many patterns generated and combined there will be many books. However, if the pattern is too general, many nonbooks may be found.

In order to increase the accuracy, the specificity of the pattern is measured. The specificity of a pattern p can roughly correspond to $-\log(P(X \in M_D(p)))$ where X is some random variable distributed uniformly over the domain of tuples of R. If the domain is infinite like the space of all strings, the uniform distribution may not be sensible and a different distribution should probably be used.

For quick computation, specificity of a pattern (|s| denotes the length of s) can be calculated by the following: specificity (p)=|p.middle||p.urlprefix||p.prefix||p.suffix|. In other words, the specificity of the pattern is determined by the product of the lengths of the strings that make up the pattern. This ensures that all the strings of a pattern are nonempty (otherwise the specificity is zero).

Patterns with too low a specificity can be rejected so that overly general patterns are not generated. More specifically, patterns can only be accepted if their specificity(p)n>t where n is the number of books with occurrences supporting the pattern p and t is a threshold (e.g., a predetermined specificity). Thus, the specificity increases in proportion to the number of tuples that match the pattern. Also, n>1 should be true since basing a pattern on one example is very error-prone. As described above, the process can be complete when a predetermined number of tuples of information are extracted. Additionally, the process can complete when there are no more patterns identified that have a specificity greater than a predetermined specificity.

Returning to step 515, if the specificity is less than a predetermined specificity, then no pattern is identified at step 505. In a preferred embodiment, an additional check is performed. If all the occurrences in the group do not have the same URL, then the URL prefix is shortened until the group can be broken into more than one group. Each of these new groups can be processed by returning to step 501 and proceeding as described above. Thus, a simple further subdivision based on the URL can be used when the pattern is generated is not sufficiently specific. Additionally, the prefix and/or suffix text can be used for subdivisions.

An important aspect of the invention is the GenPatterns routine that takes a set of occurrences of books, in this example, and converts them into a list of patterns. This is a nontrivial problem and there is the entire filed of pattern recognition devoted to solving the general version of this problem. However, a simple set of heuristics for generating patterns from occurrences can be utilized with excellent results. As long as there are a few false positives (patterns that generate nonbooks), this is sufficient. Each pattern need only have a very small coverage since the Web is vast and there are many sources of information so the total coverage of all the patterns can still be substantial.

With respect to performance, there are two very demanding tasks—finding occurrences of books given a long list of books and finding pattern matches given a list of patterns. Both of these operations may take place over a very large database of Web documents.

For the first task of finding occurrences of books, finding occurrences of books, the data was passed through two fgrep filters. One filter only passed through lines that contained a valid author and the other filter only passed through lines that contained a valid title. After this, it is the task of a program written in Python to actually check that there are matching authors and titles in the line, identify them and produce occurrences as output. Several alternative approaches involving large regular expressions in Flex and in Python were attempted for this purpose but they quickly exceed various internal bounds.

For the second task of finding pattern matches, a Python program was used. Every pattern was translated into a pair of regular expressions, one for the URL and one for the actual occurrence. Every URL was first tested to see which patterns apply to it. Then the program tests every line for the relevant regular expressions. This approach can be fairly slow so future versions may likely to use Flex or rex C library. This task can be made somewhat easier by targeting just the URLs that match the patterns. However, the data is not structured to make that completely trivial and it would be desirable to develop techniques that are general enough to be able to handle no restrictions on URLs.

The generation of patterns from occurrences is not much of a performance issue with this example because there are only thousands of occurrences generated. As larger extractions are performed, this will likely become more important Currently, the occurrences are sorted using gsort by order and middle. The Python program reads through the resulting list and generates the patterns.

Returning to the example of finding books by (author,title) pairs, an initial set of five books was used as the seed. The (author,title) pairs for these books are shown in the table in FIG. 8. For a database, a repository of 24 million web pages totaling 147 gigabytes was used. This data is part of the Stanford WebBase and is used for the GOOGLE search engine, which includes an embodiment of the invention. As a part of the search engine, an inverted index of the entire repository was built.

The repository spans many disks and several machines. It takes a considerable amount of time to make just one pass over the data even without doing any substantial processing. Therefore, passes were only made over subsets of the repository on any given iteration. It should be noted that the repository contains almost no web pages from Amazon because their automatically generated URLs make crawling difficult.

Figure 8:
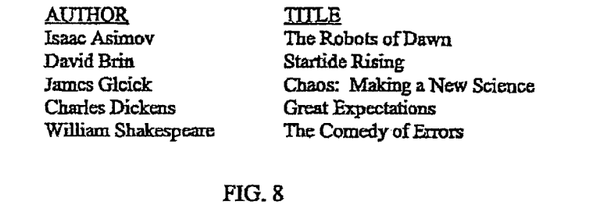
FIG. 8 shows a table of initial tuples of information.
Figure 9:
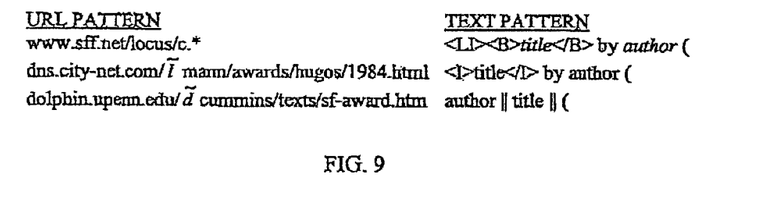
FIG. 9 shows a table of URL patterns and text patterns that were identified from the tuples of information in FIG. 8.
Figure 10:
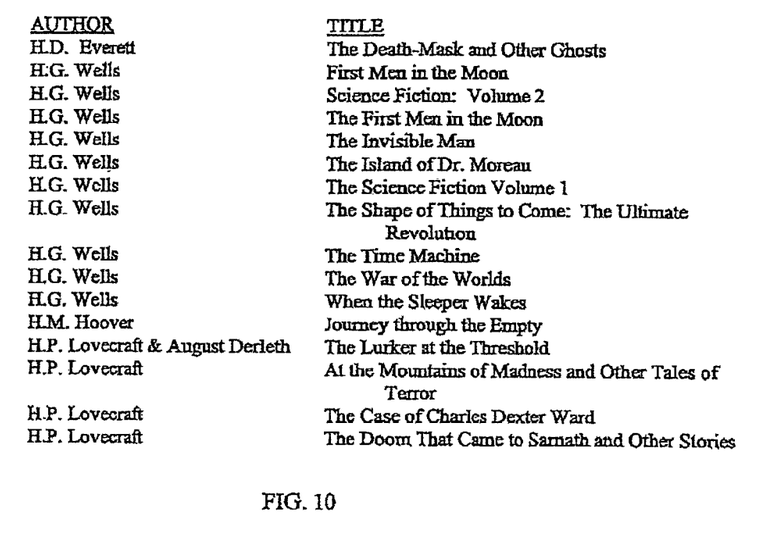
FIG. 10 shows a table of additional tuples of information that were found utilizing the patterns of FIG. 9.

A search for occurrences of tuples of information for the five books in FIG. 8 produced 199 occurrences and generated three patterns. The three patterns are shown in a table in FIG. 9. Interestingly, only the first two of the five books produced the patterns because they were both science fiction books. A run of these patterns over matching URLs produced 4047 unique (author, title) pairs. These additional tuples were mostly science fiction by there were some exceptions. FIG. 10 shows a sample of books that were found using the three patterns from FIG. 9.

A search through roughly 5 million web pages for the additional tuples of information found 3972 occurrences of these books. These occurrences produced 105 patterns, 24 of which had URL prefixes which were not complete URLs. A pass over a couple million URLs produced 9369 unique (author, title) pairs. There were some erroneous books among these. For example, 242 of the occurrences had legitimate titles but had an author of "Conclusion". These occurrences were clearly erroneous so they were manually removed, but this was the only manual intervention through the whole process. It is not clear whether keeping the erroneous books would have produced an extraordinary amount of junk.

Figure 11A:
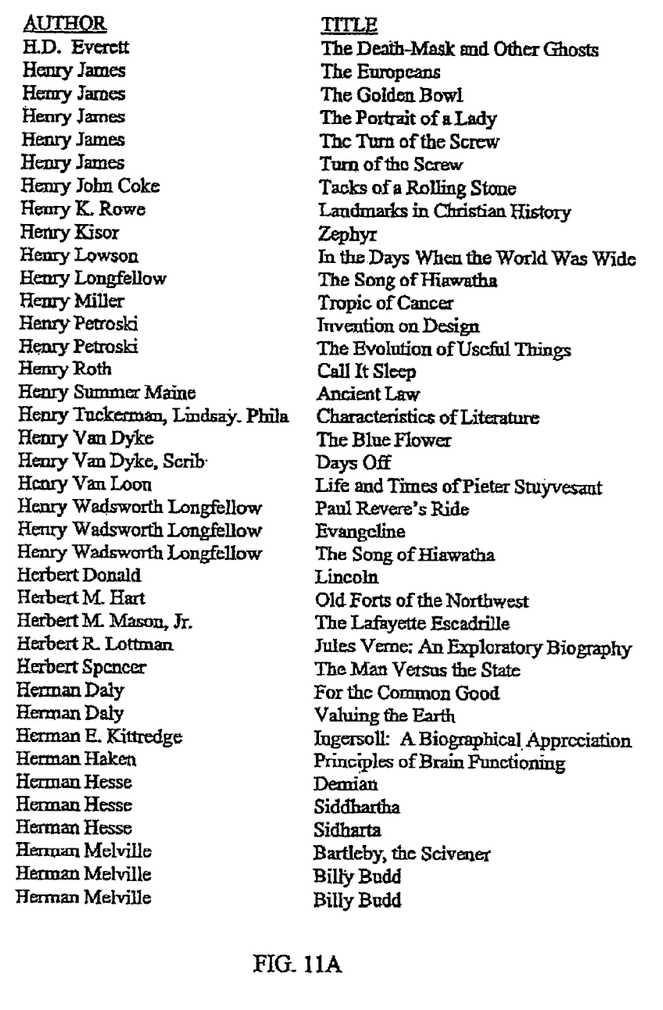
FIGS. 11A and 11B show tables of a portion of the books that were found in this example.
Figure 11B:
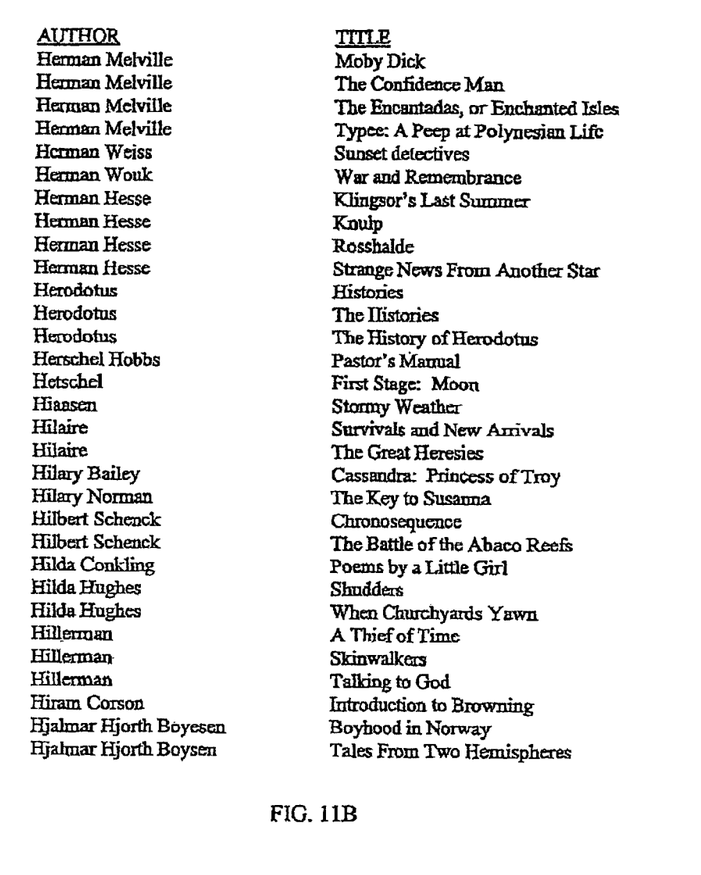

For the final iteration, the subset of the repository that contained the work books was used, which included roughly 156,000 documents. Scanning for the 9127 remaining books produced 9938 occurrences. These occurrences in turn generated 346 patterns. Scanning over the same set of documents produced 15257 unique books with very little erroneous books. A portion of these books is shown in the tables of FIGS. 11A and 113B.

To analyze the quality of the results, twenty books were selected at random out of the list to verify that they were actual books. As a measure of the quality of the results, 19, of the 20 were all bonafide books. The remaining book was actually an article—"Why I Voted for a User Car" by Andrew Tobias.

A number of the books were not found in some or all of the sources except for the Web. Some of these books were online books, some were obscure or out of print and some simply were not listed on some sites for no apparent reason. It is interesting to note that in total, 5 of the 20 books were not on Amazon's web site, which claims to have a catalog of 2.5 million books.

Some books are mentioned several times due to small differences such as capitalization, spacing, and how the author was listed (for example "E. R., Burroughs" versus "Edgar Rice Burroughs"). Fortunately, however, authors are quite particular about how their name is listed and these duplications are limited. In several cases, some information was appended to the author's name such as publication date.

It would be desirable to be able to extract structured data from the entire Web by leveraging on its vastness. Embodiments of the invention have proven to be a remarkable tool in the simple example of finding lists of books. It started with a sample set of five books and expanded it to a relatively high quality list of over 15,000 books with very minimal human intervention. The same tool may be applied to a number of other domains such as movies, music, restaurants, people directories, product catalogs, and more.

One challenge is to prevent or hinder divergence from the target as the relation is expanded. For example, since two science fiction books were in the seed sample, it is fairly surprising that the expansion did not produce a large list of science fiction books. Clearly, the expansion gravitated to a compilation of all books and even a few scattered articles managed to enter the relation. Keeping this effect under control as the relation expands is nontrivial but there are several possibilities.

One possibility is to redefine of $M_D(P)$ to require multiple patterns to match a tuple. A more extreme version of this is to assign a weight to every tuple and pattern. A matching tuple is assigned a weight based on the weights of the patterns it matches. A generated pattern is assigned a weight based on the weights of the tuples that match it. If this is done linearly, this technique breaks down to a singular value decomposition of the tuple-pattern matrix (multiplied by its transpose). This is analogous to Latent Semantic Indexing (LSI), which is done on the document-word matrix. In this case, the eventual steady state is the dominant eigenvector. Unfortunately, this is independent of the initial sample that is clearly not desirable. Nonetheless, the relationship to LSI is compelling and may be investigated further.

The independence of the steady state from the initial state above may also be a problem even without the use of weights. These are several possible solutions. One is to run only through a limited number of iterations as was done in the example described herein. Another solution is to make sure that the transformation of tuples to patterns to tuples is nonlinear and has some local steady states, which depend on the initial state. This can be accomplished through the use of the initial sample R' in the computation of GenPatterns. In this case, the user may also provide an $\overline{R}$', a list of counterexamples.

One of the most surprising results of the example was finding books which were not listed in major online sources such as the book "Disbanded" by Douglas Clark, which is published online or "The Young Gardners' Kalendar" by Dollie Radford, which is an obscure work published in 1904. If the book list can be expanded and if almost all books listed in online sources can be extracted, the resulting list may be more complete than any existing book database. The generated list would be the product of thousands of small online sources as opposed to current book databases, which are the products of a few large information sources.

The above has described patterns to extract tuples of information that satisfy a relation. Multiple relations can also be analyzed simultaneously with one relation influencing another. For example, a relation First=(first name) includes recognized first names of people and a relation Last=(last name) includes recognized last names of people. The First and Last relations can be initialized any number of ways including utilizing the information extraction techniques described above. In this example, the First and Last relations are initialized with the first and last names of a few authors. When tuples of information are extracted that satisfy the relation Author=(first name, last name), a test is performed to verify that either the first name or the last name of each tuple satisfies the relation First or Last, respectively. If one of the First or Last relations is satisfied, the tuple is accepted. The corresponding first or last name of each accepted tuple can then be added to the appropriate relation First or Last in order to simultaneously grow the relations. In other embodiments, the relations may not grow simultaneously, such as when one or more of the relations is initialized to a state that should remain unchanged. It should be noted that the relations utilized herein are fairly simple for purposes of illustration, but the relations may include more fields in practice.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method performed by one or more devices, the method comprising:
identifying, by the one or more devices, a tuple, from text of a plurality of documents, using a first data pattern;
identifying, by the one or more devices, second data patterns,
the first data pattern being different than each of the second data patterns;
determining, by the one or more devices, a quantity of the second data patterns that match the tuple; and
storing, by the one or more devices, the tuple in a data storage when the quantity of the second data patterns that match the tuple satisfies a particular threshold.

2. A system comprising:
one or more processors; and
one or more memories including a plurality of instructions that, when executed by the one or more processors, cause the one or more processors to:
identify a tuple, from text of a plurality of documents, using a first data pattern;
identify second data patterns,
the first data pattern being different than each of the second data patterns; determine a quantity of the second data patterns that match the tuple; and store the tuple in a data storage when the quantity of the second data patterns that
match the tuple satisfies a particular threshold.

3. A non-transitory computer-readable storage medium comprising:
one or more instructions which, when executed by at least one processor, cause the at least one processor to:
identify a tuple, from text of a plurality of documents, using a first data pattern;
identify second data patterns,
the first data pattern being different than each of the second data patterns; determine a quantity of the second data patterns that match the tuple; and
store the tuple in a data storage when the quantity of the second data patterns that match the tuple satisfies a particular threshold.

4. The method of claim 1, further comprising:
searching the plurality of documents to identify an occurrence of another tuple in text of the plurality of documents and a context for the other tuple in the text of the plurality of documents;
analyzing the identified occurrence and the context to identify another data pattern that corresponds to the other tuple; and
identifying the tuple using the other data pattern.

5. The method of claim 1, further comprising:
disregarding the tuple when the quantity of the second data patterns that match the tuple does not satisfy the particular threshold.

6. The method of claim 1, further comprising:
determining a specificity of the first data pattern based on a quantity of occurrences of the tuple in the text of the plurality of documents.

7. The method of claim 1, where the first data pattern includes first text and second text, the first text preceding information in the tuple and the second text following the information in the tuple.

8. The system of claim 2, where the one or more processors are further to:
search the plurality of documents to identify an occurrence of another tuple in text of the plurality of documents and a context for the other tuple in the text of the plurality of documents;
analyze the identified occurrence and the context to identify another data pattern that corresponds to the other tuple; and
identify the tuple using the other data pattern.

9. The system of claim 2, where the one or more processors are further to:
disregard the tuple when the quantity of the second data patterns that match the tuple does not satisfy the particular threshold.

10. The system of claim 2, where the one or more processors are further to:
determine a specificity of the first data pattern based on a quantity of occurrences of the tuple in the text of the plurality of documents.

11. The system of claim 2, where the first data pattern includes first text and second text, the first text preceding information in the tuple and the second text following the information in the tuple.

12. The medium of claim 3, further comprising:
one or more instructions to search the plurality of documents to identify an occurrence of another tuple in text of the plurality of documents and a context for the other tuple in the text of the plurality of documents;
one or more instructions to analyze the identified occurrence and the context to identify another data pattern that corresponds to the other tuple; and
one or more instructions to identify the tuple using the other data pattern.

13. The medium of claim 3, further comprising:
one or more instructions to disregard the tuple when the quantity of the second data patterns that match the tuple does not satisfy the particular threshold.

14. The medium of claim 3, further comprising:
one or more instructions to determine a specificity of the first data pattern based on a quantity of occurrences of the tuple in the text of the plurality of documents.

15. The medium of claim 3, where the first data pattern includes first text and second text, the first text preceding information in the tuple and the second text following the information in the tuple.

16. The method of claim 4, where
the other tuple includes a plurality of fields that each represent a character string, and
searching the plurality of documents to identify the occurrence of the other tuple in the text of the plurality of documents includes identifying an occurrence of text, in the plurality of documents, that matches the character strings of the other tuple.

17. The method of claim 4, where the tuple is different than the other tuple.

18. The system of claim 8, where
the other tuple includes a plurality of fields that each represent a character string, and the one or more processors, when searching the plurality of documents to identify the occurrence of the other tuple in the text of the plurality of documents, are further to:
identify an occurrence of text, in the plurality of documents, that matches the character strings of the other tuple.

19. The system of claim 8, where the tuple is different than the other tuple.

20. The medium of claim 12, where
the other tuple includes a plurality of fields that each represent a character string, and
one or more instructions to search the plurality of documents to identify the occurrence of the other tuple in the text of the plurality of documents include:
one or more instructions to identify an occurrence of text, in the plurality of documents, that matches the character strings of the other tuple.

\* \* \* \* \*